United States Patent
Pupovac et al.

(10) Patent No.: US 10,549,482 B2
(45) Date of Patent: Feb. 4, 2020

(54) LIMITING DISPERSION OF IR RADIATION FROM A HEATER ELEMENT DURING PLASTIC WELDING

(71) Applicant: SPM AUTOMATION (CANADA) INC., Windsor (CA)

(72) Inventors: Rade Pupovac, Tecumseh (CA); Zachary Touesnard, Windsor (CA); Christian Peter Holtkamp, Windsor (CA); Boris Novakovic, Lakeshore (CA)

(*) Notice: Subject to any disclaimer, the term of this patent is extended or adjusted under 35 U.S.C. 154(b) by 59 days.

(21) Appl. No.: 15/639,818

(22) Filed: Jun. 30, 2017

(65) Prior Publication Data

US 2018/0022035 A1    Jan. 25, 2018

Related U.S. Application Data

(60) Provisional application No. 62/366,178, filed on Jul. 25, 2016.

(51) Int. Cl.
*B29C 65/30*    (2006.01)
*B29C 65/14*    (2006.01)

(52) U.S. Cl.
CPC .......... *B29C 65/1412* (2013.01); *B29C 65/30* (2013.01)

(58) Field of Classification Search
CPC ............ B29C 65/1412; B29C 65/1432; B29C 65/1487; B29C 65/1496; B29C 65/20; B29C 65/30; B29C 65/305; B29C 66/003; B29C 66/242; B29C 66/244; B29C 66/301; B29C 66/348; B29C 66/54; B29C 66/73921; B29C 66/81831
USPC ....................................................... 156/272.2
See application file for complete search history.

(56) References Cited

U.S. PATENT DOCUMENTS

| | | | | |
|---|---|---|---|---|
| 5,918,441 A | * | 7/1999 | Baker | ..................... B29C 65/18 53/284.7 |
| 6,207,299 B1 | * | 3/2001 | Krauth | ...................... C23C 2/12 428/653 |
| 2004/0256058 A1 | * | 12/2004 | Irwin | ..................... B29C 65/18 156/580 |
| 2013/0146227 A1 | * | 6/2013 | Mileti | .................... H01C 17/06 156/583.1 |

* cited by examiner

*Primary Examiner* — Michael N Orlando
*Assistant Examiner* — Elizabeth Bradford
(74) *Attorney, Agent, or Firm* — George L. Boller

(57) ABSTRACT

In a process for welding plastic parts together, an IR shield redirects IR radiation emitted from a heater of a heating tool so that IR radiation which would otherwise be directly incident on certain portions of a plastic part and/or on other parts of the heating tool is avoided.

9 Claims, 5 Drawing Sheets

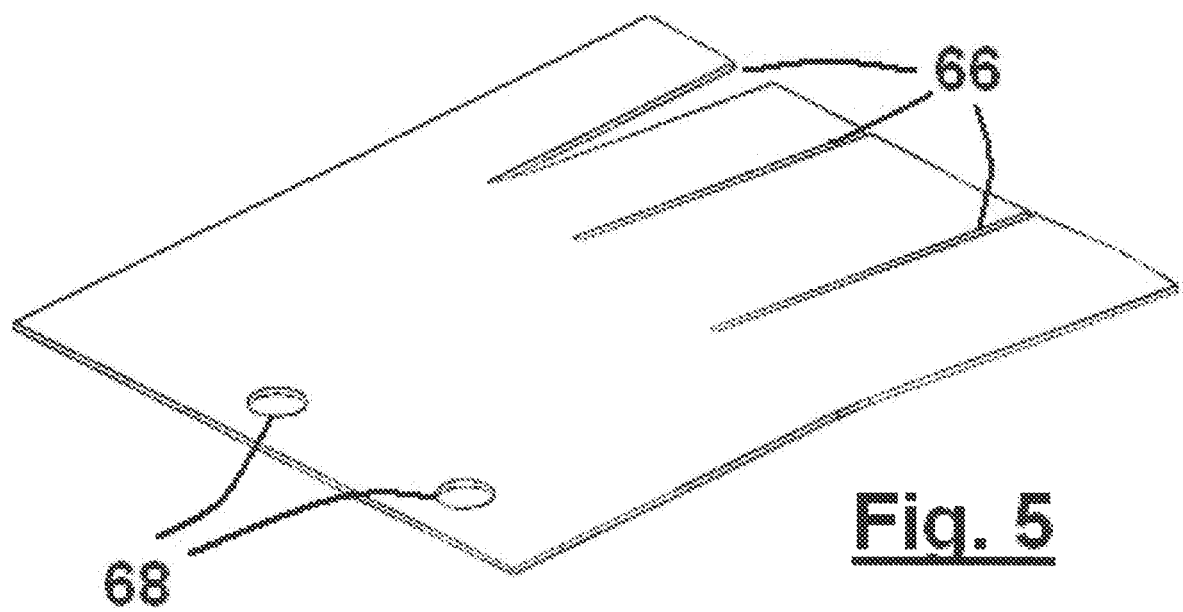
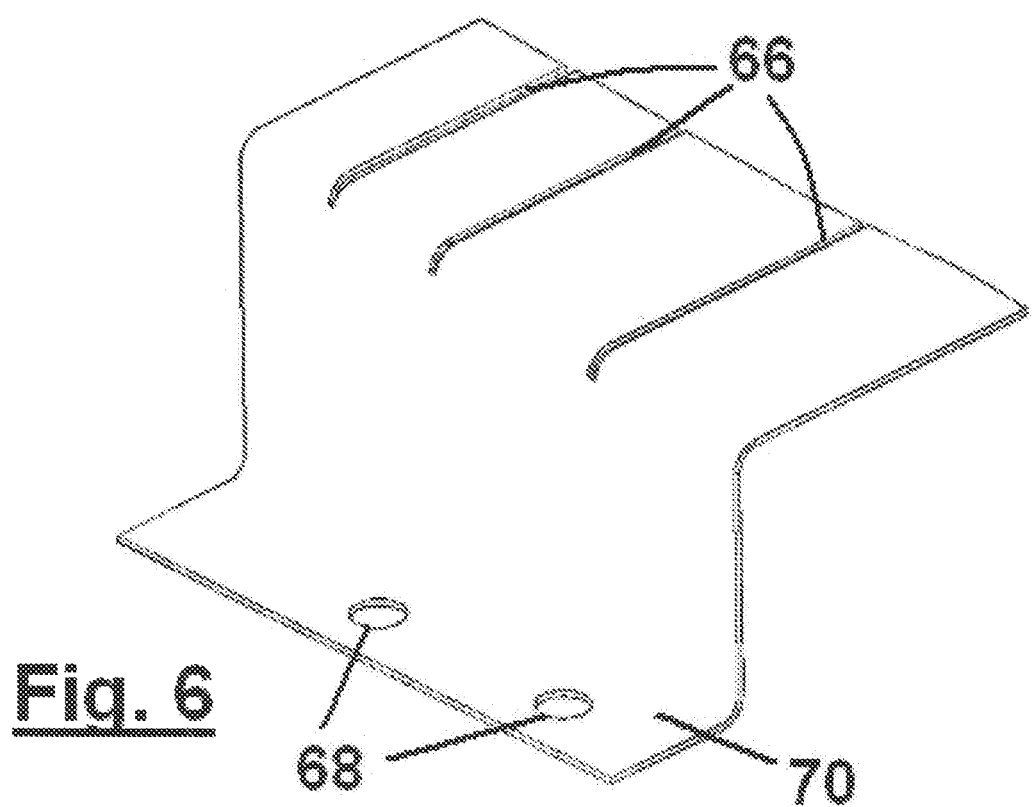

LIMITING DISPERSION OF IR RADIATION FROM A HEATER ELEMENT DURING PLASTIC WELDING

REFERENCE TO RELATED APPLICATION AND PRIORITY CLAIM

This application claims the priority of Provisional Patent Application No. 62/366,178, filed 25 Jul. 2016, the entire content of which is incorporated herein by reference.

TECHNICAL FIELD

This disclosure relates to welding of plastic parts.

BACKGROUND

Plastic parts are commonly manufactured by a molding process, such as blow molding or injection molding, and then further processed by one or more operations such as boring, drilling, and/or welding.

Welding is a process for joining plastic parts together by melting plastic at a location in each part where a weld joint is to be created, then placing the parts together so that their melt pools merge together, and then allowing the melt pools to solidify and create the finished weld joint.

One type of plastic welding known as contact welding is performed by a heating tool which has a heater element, a hot plate for example, which is heated by a heat source. Thermally conductive parts of the tool which are in contact with the heater element are heated by thermal conduction of heat from the heater element. Other parts not in direct contact with the heater element are exposed to heat radiated by either the heater element and/or parts which have been heated by thermal conduction. A portion of the heater element has a feature which is placed in direct contact with a plastic part to melt plastic at a location where a weld joint is to be created.

Another type of plastic welding known as non-contact welding is performed by a heating tool which has a part which is either a heater, or a heater element heated by a heater, and which is placed a short distance from a surface portion of a plastic part where a weld joint is to be created to radiate heat which melts the plastic at that surface portion.

In both contact welding and non-contact welding, radiated heat lies in the infra-red (IR) band of the electromagnetic spectrum and may comprise wavelengths ranging from short to long. Various types of IR heater elements used in non-contact welding include IR bulbs, wire foil heaters, and ceramic heaters. Even a hot plate heater may be used for non-contact welding if not placed in direct contact with a plastic part.

Because one or more parts of a plastic welding heating tool emit IR radiation, and because that radiation may disperse to some degree before arriving at a surface portion of a plastic part which is to be melted, some IR radiation may be incident on surface portions of a plastic part beyond a portion which is to be melted, and may have an undesired effect on the part.

SUMMARY OF THE DISCLOSURE

This disclosure relates to heating tools for melting plastic of plastic parts by either contact welding or non-contact welding, characterized by mitigation of dispersion of IR radiation beyond an intended location at which a weld joint is to be created, and to a related method for mitigating dispersion of IR radiation beyond an intended location for a weld joint. Operating efficiency of a heating tool may be increased by recovery of dispersed IR radiation.

A plastic welding heating tool comprises a heater, and/or a heater element heated by a heater, for melting plastic of a plastic part where a weld joint is to be created. An IR radiation shield is mounted on the heating tool and is shaped to selectively shield surfaces of the heating tool and/or of the plastic part from receiving incident IR radiation. The shield confronts one or more unshielded zones of the tool and/or plastic part, leaving one or more other zones unshielded. IR radiation is directly incident on an unshielded zone. The shield, by confronting one or more unshielded zones of the tool and/or plastic part, redirects incident IR radiation by reflecting a significant percentage of IR radiation which would otherwise be incident on any such unshielded zone. The direction of reflection is a function of the angle of incidence of IR on any particular area of the shield surface. IR radiation may be reflected fully or partially back toward its point of origin, allowing energy of the reflected radiation to be recovered by the heating tool. The energy recovery is additive to the thermal energy which is being added by the heater so that the sum of the energies maintains desired temperature of the heating tool for melting plastic. That capability enables the quantity of thermal energy being added by a heater to be significantly reduced from what it would be in the absence of the shield. The result is a more energy-efficient method for both non-contact welding and contact welding of a plastic part.

If IR radiation is directly incident on portions of the surface of a plastic part beyond a surface portion where a weld joint is intended to be created, the plastic part may be affected in undesired ways, such as distortion, discoloration, etc. If the plastic part in which the weld joint is being created is one part of a multi-part assembly, dispersed IR radiation may be incident on other parts of the assembly, both plastic and non-plastic, and those other parts may be affected in undesired ways. Use of an IR shield can avoid such undesired consequences.

Emissivity is a parameter which defines a material's ability to emit IR radiation. The emissivity of any particular material lies within a numerical range between 0.0 and 1.0. In physics, a material which absorbs 100% of incident IR radiation is called a "black body". A "black body" has an emissivity value of 1.0. The opposite of a "black body" material is a material which reflects 100% of incident IR radiation, and such a material has an emissivity value of 0.0. Most materials have emissivity values between those two extremes. A shield which is used as described here for plastic welding reflects a significant percentage of IR radiation as recoverable energy and has an emissivity value closer to 0.0 than to 1.0.

Some examples of materials suitable per se for use as a shield, or as a coating for a shield, and their emissivity values (e), are: polished titanium (e=0.1); polished aluminum (e=0.1); gold (e=0.05); titanium nitride (e=0.1); silver and silver coating polished (e=0.02); zinc and zinc coating polished (e=0.05); chromium and chromium coating polished (e=0.1); nickel, electroplated (e=0.03); and nickel, polished (e=0.072).

A material having emissivity no greater than 0.3 is preferred for plastic welding applications. For non-contact plastic welding, aluminized steel (steel which has an aluminum-silicon alloy coating) provides an efficient and cost-effective shield. It can be easily shaped to simple- and/or complex-shaped heating tool geometries, it can withstand high temperatures required for non-contact plastic welding, and it has good corrosion resistance. Furthermore, it has emissivity significantly less than 0.3.

In one general respect, the claimed subject matter relates to a heating tool for performing an operation on a plastic part to melt plastic at a location where a weld joint is to be created. The heating tool has: a) a thermally conductive body having a base, a top, and a side which joins the top and the base, the top having a shape conforming to that of plastic to be melted for creating a weld joint in a plastic part; b) a heater for heating the thermally conductive body to create a temperature at the top for enabling the top to melt plastic; c) an IR shield confronting at least a portion of the side of the thermally conductive body without obstructing the top of the body, the shield comprising an inner first layer having an inner face facing the side for reflecting incident heat radiated from the body back toward the body and an outer face disposed against an inner face of an outer second layer, material of the inner first layer having lower emissivity than material of the outer second layer.

In another general respect, the claimed subject matter relates to a heating tool for melting a surface portion of a plastic part at a location where a weld joint is to be created during a plastic welding process. The heating tool comprises: a) a heater having a shape for melting a surface portion of a plastic part at a location where a weld joint is to be created and for emitting IR radiation in a direction beyond the surface portion where a weld joint is to be created; and b) an IR shield having a reflecting face having an emissivity no greater than 0.3 for redirecting IR radiation emitted by the heater in a direction beyond the surface portion where a weld joint is to be created in a different direction.

In still another general respect, the claimed subject matter relates to a plastic welding process comprising: a) operating a heater to melt a surface portion of a plastic part at a location where a weld joint is to be created while the heater is also emitting IR radiation in a direction beyond the surface portion where a weld joint is to be created; and b) redirecting IR radiation being emitted beyond the surface portion where a weld joint is to be created by reflecting IR radiation which is incident on an IR shield off a reflecting surface of a first of two layers of the IR shield which are disposed against each other, material of the first layer having lower emissivity than material of a second of the two layers.

BRIEF DESCRIPTION OF THE DRAWINGS

FIG. 5 is a perspective view of a part of a low emissivity shield.

FIG. 6 is a perspective view of the part of FIG. 5 formed to a different shape.

DETAILED DESCRIPTION

Figure 1:
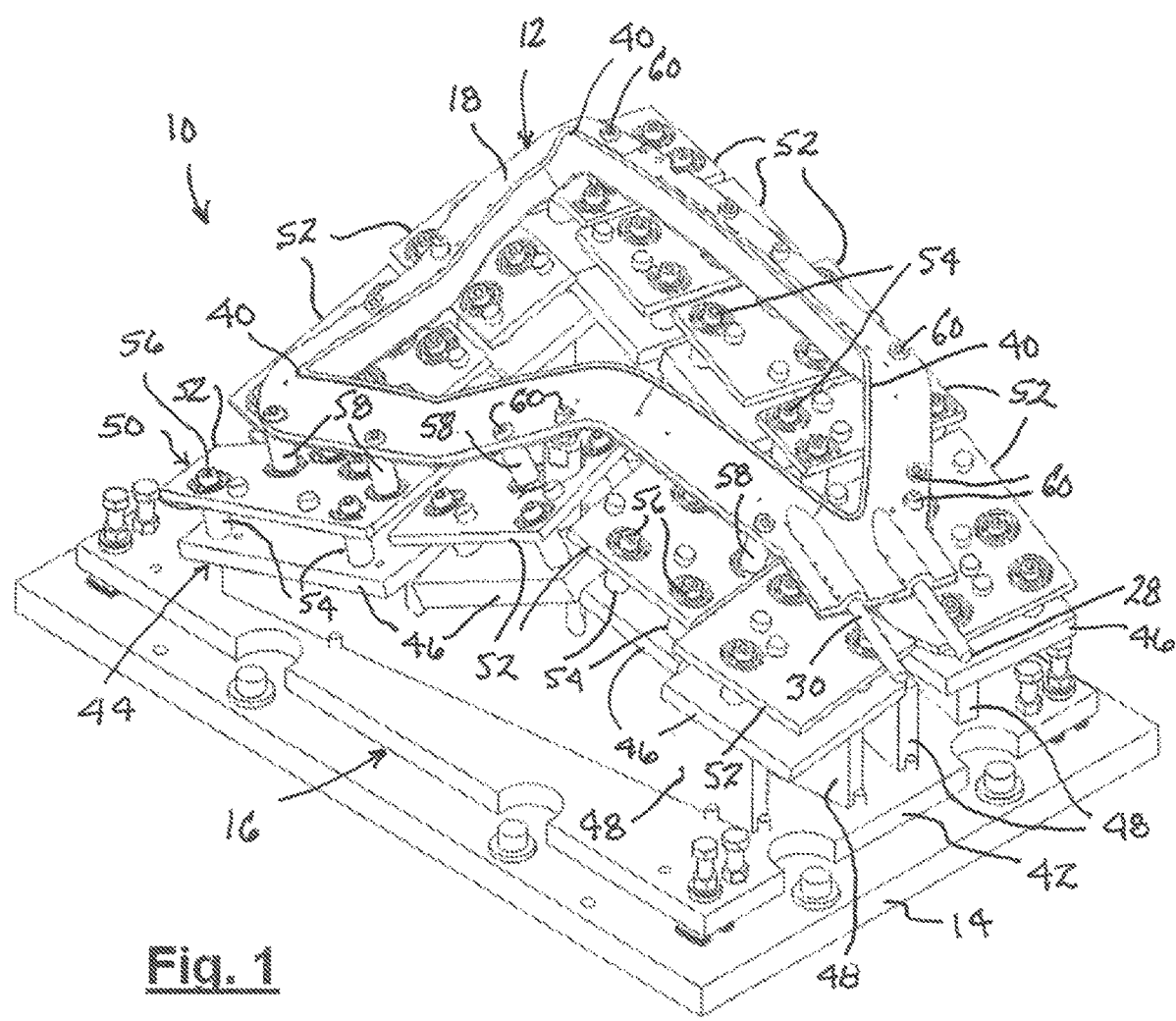
FIG. 1 is a perspective view of a hot plate assembly mounted on a tooling plate of a welding machine.

FIG. 1 shows a heating tool 10 for performing an operation on a plastic part (not shown) to melt plastic at a location where a weld joint is to be created. Tool 10 comprises, as its heater element, a hot plate assembly 12 which is supported on a tooling plate 14 by a support structure 16.

Figure 3:
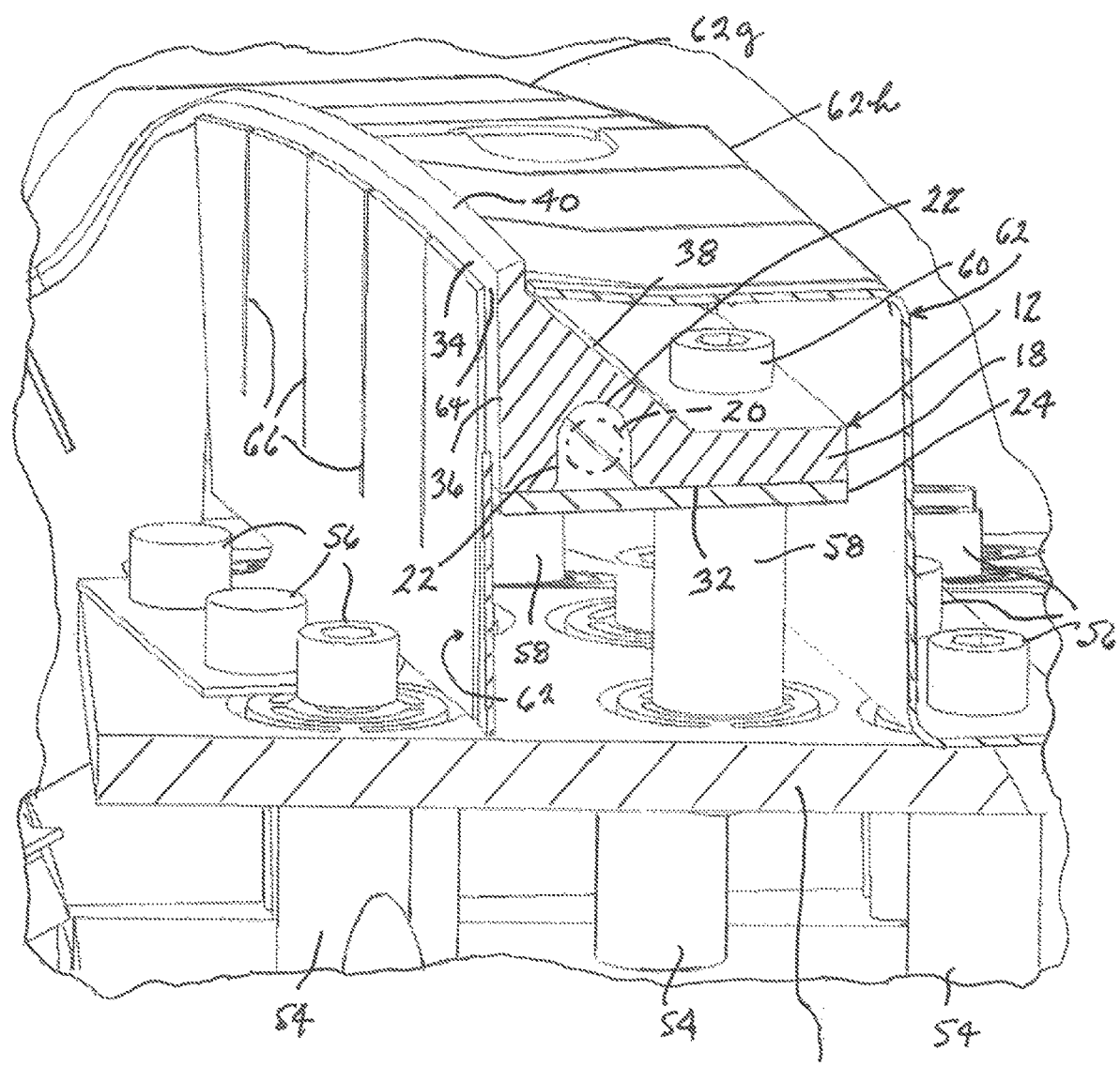
FIG. 3 is an enlarged fragmentary view of a portion of FIG. 2 in the direction of arrows 3-3 in FIG. 2.
Figure 4:
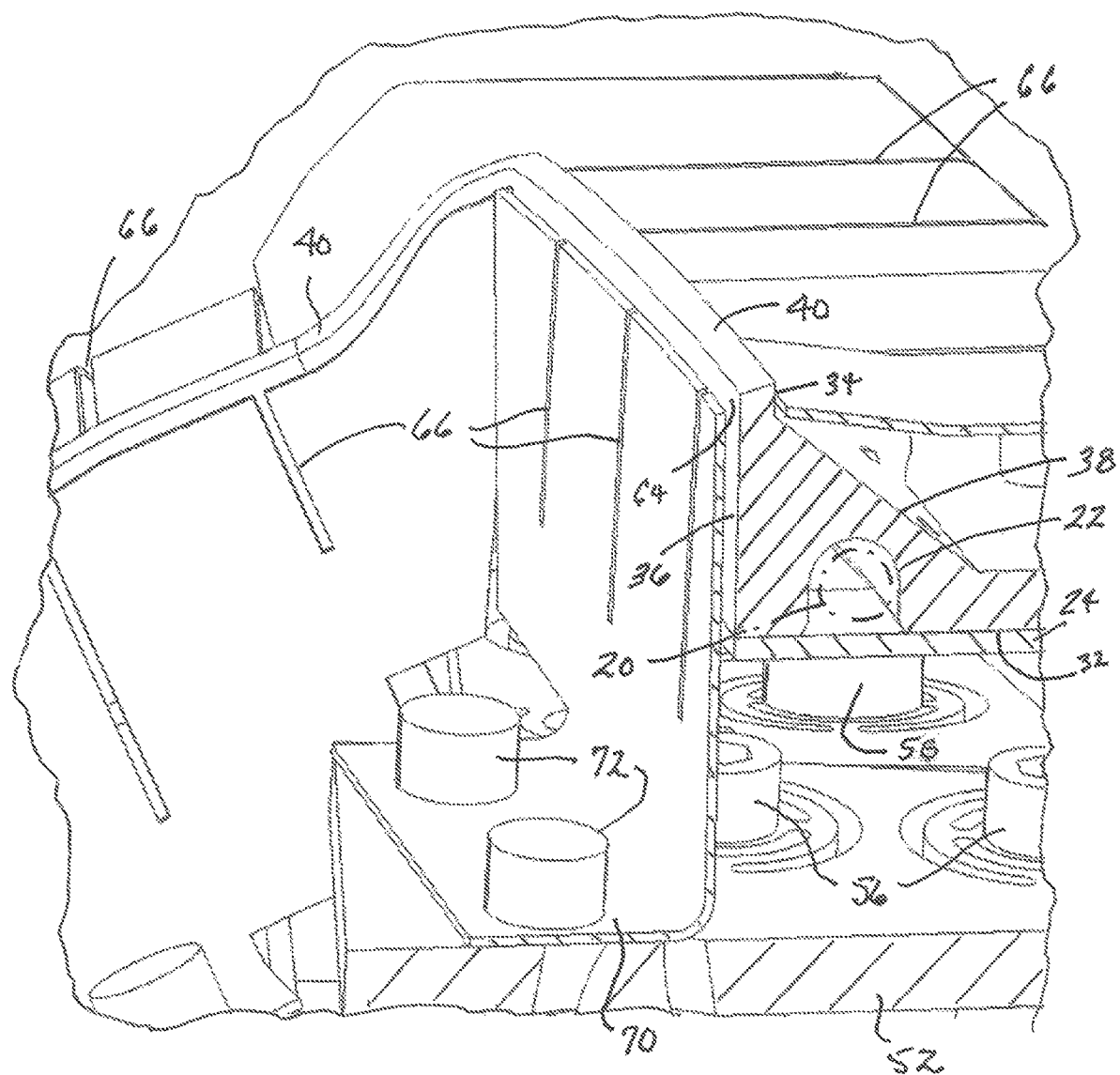
FIG. 4 is an enlarged view of a portion of FIG. 3.

Hot plate assembly 12 comprises a hot plate which has a thermally conductive body 18 whose shape has a feature which corresponds to that of a surface of a plastic part at a location where a weld joint is to be created. FIGS. 3 and 4 show hot plate assembly 12 to further comprise an electric heater 20 (shown in phantom) which is disposed within a channel 22 in body 18 and captured within channel 22 by a retainer plate 24 fastened to body 18. An example of heater 20 is a conventional flex heater pressed against body 18 by fastening of retainer plate 24 to body 18. FIG. 1 shows electrical leads 28, 30 of heater 20 extend outward from body 18 for connection to an electric power source (not shown). When heater 20 is energized by electric current, heat is transferred primarily from the heater into body 18 but also to some extent into retainer plate 24.

The hot plate shape shown by the example of the Figs. may be described as generally polygonal and having an endless length surrounding an open center. FIGS. 3 and 4 show that body 18 has a base 32, a top 34, and opposite sides 36, 38, side 36 being an inner perimeter side and side 38 being an outer perimeter side. Top 34 comprises a ridge 40, a feature whose shape conforms to that of the weld joint to be created. Along the endless length of body 18 surrounding the open center, ridge 40 has an elevation which, as measured to tooling plate 14, varies along that length for conforming to a three-dimensional shape of the surface of the plastic part which is to be melted to create the weld joint.

FIG. 1 shows support structure 16 to comprise a platform 42 fastened to tooling plate 14 and a lower tier 44 of individual flat plates 46 supported by several vertical walls 48 which are fastened to platform 42 and have various portions of their upper edges shaped to support plates 46 of tier 44 for general conformance with the perimeter shape of the hot plate. An upper tier 50 of support structure 16 comprises individual plates 52 each parallel with and overlying a respective plate 46 of lower tier 44. Tubular posts 54 separate each plate 52 of upper tier 50 from the respective plate 46 of lower tier 44. A respective fastener 56 passes through each post 54 to secure plates 52 to plates 46. Hot plate assembly 12 is fastened to plates 52 in the same manner by tubular posts 58 and fasteners 60.

Figure 2:
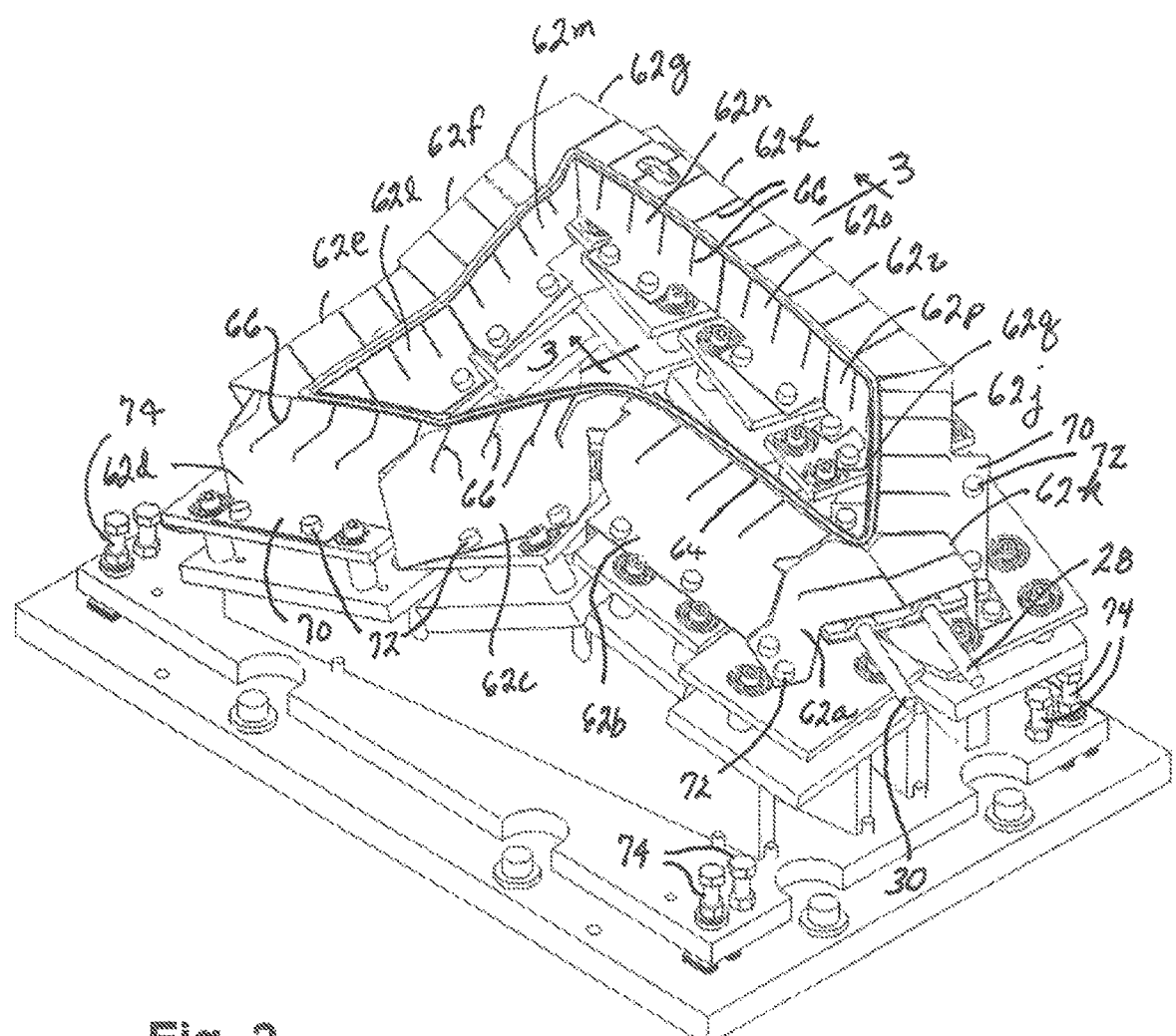
FIG. 2 is a view like FIG. 1 showing a low emissivity shield assembled to the hot plate assembly.

FIG. 2 shows a multi-part shield 62 confronting sides 36, 38 of body 18 while leaving an opening 64 which leaves ridge 40 unobstructed by the shield. Shield parts 62a, 62b, 62c, 62d, 62e, 62f, 62g, 62h, 62i, 62j, and 62k (FIGS. 2-4) confront essentially the entire perimeter of outer perimeter side 38. Other shield parts, some of which are parts 62l, 62m, 62n, 62o, 62p, and 62q, confront essentially the entire perimeter of inner perimeter side 36, it being understood that the direction from which FIGS. 2-4 are viewed prevents some shield parts which confront inner perimeter side 36 from being seen.

The parts forming shield 62 comprise multiple layers of materials which have different emissivities. An inner first layer of a shield part has an inner face facing body 18 for reflecting a majority of IR radiation incident on the inner face of the inner first layer back toward the body. The inner first layer has an outer face opposite its inner face. That outer face is disposed against an inner face of an outer second layer of the part. Material of the inner first layer has lower emissivity than material of the outer second layer. Aluminized steel is an example of a material having sheet steel as its second layer and an aluminum-silicon alloy coating on one face of the steel as its first layer.

The shield parts of shield 62 comprise various slits 66 and bends for conforming each shield part to the length of ridge 40 and to varying elevation of ridge 40 along its length. Slits 66 extend in the individual shield parts from edges of the individual shield parts which confront portions of opening 64. In the example of the Figs., ridge 40 protrudes through opening 64 a short distance beyond shield 62.

Shaping of the illustrated shield parts from flat aluminized steel sheet stock is explained with reference to FIGS. 5 and 6. The stock is cut to an appropriate size and shape for each part, including cutting which creates slits 66. The cut stock is formed to a desired shape like the one shown in FIG. 6. Attachment holes 68 are also punched or drilled. A part can be formed to a desired shape, as exemplified by FIG. 6 which provides a foot 70 containing holes 68 for fastening the part to a plate 52 using fasteners 72 as shown in FIGS. 2-4. While it is intended that the shield parts not be in contact with the heater element which melts plastic, occasional incidental contact may be tolerated without significant consequences, provided that such contact does not interfere with the plastic surface being melted.

Heating tool 10 is used by mounting a plastic part on one platen of a welding machine, mounting heating tool 10 on an opposite platen, heating the heating tool, and closing the platens to bring ridge 40 into contact with, or close to, the plastic part. Leveling screws 74 are used to set the planarity of platform 42 to tooling plate 14 so that ridge 40 has the proper match to the portion of the plastic part which is to be melted.

What is claimed is:

1. A heating tool for performing an operation on a plastic part to melt plastic at a location where a weld joint is to be created, the heating tool comprising:
   a) a thermally conductive body having a base, a top, and a side which joins the top and the base, the top having a shape conforming to that of plastic to be melted for creating a weld joint in a plastic part;
   b) a heater for heating the thermally conductive body to create a temperature at the top for enabling the top to melt plastic;
   c) an IR shield confronting at least a portion of the side of the thermally conductive body without obstructing the top of the body, the shield comprising an inner first layer having an inner face facing the side for reflecting incident heat radiated from the body back toward the body and an outer face disposed against an inner face of an outer second layer, material of the inner first layer having lower emissivity than material of the outer second outer layer;
   in which the side of the thermally conductive body comprises opposite sides each of which joins the top and the base, and the shield comprises a first side which confronts a first of the opposite sides of the body and a second side which confronts a second of the opposite sides of the body, and in which the first side and the second side of the shield cooperatively define an opening which leaves the top of the body unobstructed by the shield;
   in which the top comprises a ridge;
   in which the ridge protrudes through the opening beyond the first side and the second side of the shield;
   further comprising a tooling plate and a support structure which supports the body on the tooling plate;
   in which the first side of the shield is fastened to the support structure and has an edge which confronts the ridge, and the second side of the shield is fastened to the support structure and has an edge which confronts the ridge, and in which the edge of the first side of the shield and the edge of the second side of the shield cooperatively define the opening; and
   in which the first side of the shield comprise slits extending from the edge of the first side of the shield, and the second side of the shield comprise slits extending from the edge of the second side of the shield.

2. The heating tool as set forth in claim 1 in which the ridge has a length and an elevation which as measured to the tooling plate varies along that length, and at least one of the sides of the shield comprises multiple individual shield parts fastened to the support structure.

3. The heating tool as set forth in claim 2 in which at least some of the individual shield parts comprise slits and bends for conforming the shield to varying elevation of the ridge along the length of the ridge.

4. The heating tool as set forth in claim 3 in which both of the sides of the shield comprise multiple individual shield parts.

5. The heating tool as set forth in claim 3 in which at least some of the slits extend from edges of individual shield parts which confront the ridge.

6. The heating tool as set forth in claim 1 in which the thermally conductive body comprises a channel within which the heater is disposed.

7. The heating tool as set forth in claim 6 in which the heater comprises an electric heater.

8. The heating tool as set forth in claim 1 in which the inner first layer has an emissivity no greater than 0.3.

9. The heating tool as set forth in claim 8 in which the IR shield comprises aluminized steel.

* * * * *